United States Patent
Koehler

(10) Patent No.: US 6,987,334 B2
(45) Date of Patent: Jan. 17, 2006

(54) POWER-SWITCHING MECHANISM FOR ELECTRONIC DEVICE

(75) Inventor: Duane Koehler, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 536 days.

(21) Appl. No.: 10/719,174

(22) Filed: Nov. 22, 2003

(65) Prior Publication Data

US 2005/0110350 A1   May 26, 2005

(51) Int. Cl.
   *H01H 3/26*   (2006.01)
(52) U.S. Cl. .................................... 307/140
(58) Field of Classification Search ............. 307/140
   See application file for complete search history.

(56) References Cited

U.S. PATENT DOCUMENTS

| | | |
|---|---|---|
| 4,176,288 A | 11/1979 | Komatsu et al. |
| 4,581,571 A | 4/1986 | Hansen |
| 4,670,810 A | 6/1987 | Valeur |
| 4,820,938 A | 4/1989 | Mix et al. |
| 5,003,578 A | 3/1991 | Lin |
| 5,491,721 A | 2/1996 | Cornelius et al. |
| 6,107,698 A | 8/2000 | Ochiai et al. |
| 6,282,451 B1 | 8/2001 | White |
| 2003/0234780 A1 * | 12/2003 | Hsieh et al. ................ 345/212 |

* cited by examiner

Primary Examiner—Robert L. Deberadinis

(57) ABSTRACT

A power-switching mechanism for an electronic device in one embodiment of the invention is disclosed that includes a control input and switching device. The control input is connectable to a conductor of a connection between the electronic device and a host device. The switching device is capable of coupling a power source to a power supply. The switching device is controlled by the control input, such that the switching device connects the power source to the power supply when a voltage is present on the conductor, and the switching device disconnects the power supply from the power source when the voltage is absent on the conductor.

51 Claims, 3 Drawing Sheets

POWER-SWITCHING MECHANISM FOR ELECTRONIC DEVICE

BACKGROUND

Many electronic devices, such as computer peripherals like printers, can consume large amounts of power when they are on, even when they are idle and not currently performing functional tasks. For example, when inkjet and laser printers and other types of image-forming devices are on, they may have to consume large amounts of power when idle so that when called upon to print, the printers can quickly begin printing. Other electronic devices may similarly use large amounts of power when idle.

However, individuals, organizations, and governments have recently begun to question the power consumption used by such devices, especially when they are idle and not otherwise performing functional tasks. Individuals and organizations are looking for greater energy efficiency to lower their electrical bills. Governments are looking for greater energy efficiency so that the need to build more power plants is reduced, and to avoid brownout and blackout scenarios when power plants are operating at peak capacity.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the embodiments of the invention. Other embodiments may be utilized, and logical, mechanical, and other changes may be made without departing from the spirit or scope of the appended claims. The following detailed description is, therefore, not to be taken in a limiting sense, and the scope of the present invention is defined only by the appended claims.

Overview

Figure 1:
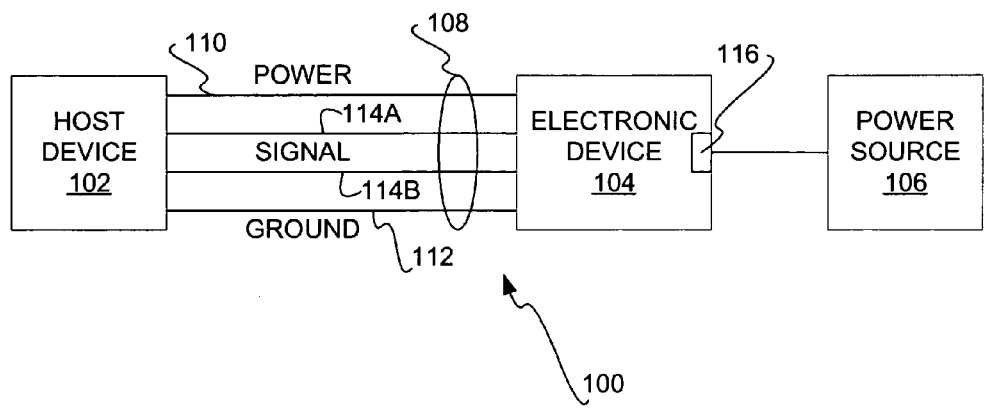
FIG. 1 is a diagram of a representative system, according to an embodiment of the invention.

FIG. 1 shows a representative system 100, according to an embodiment of the invention. The system 100 includes a host device 102, an electronic device 104 coupled to a power source 106, and a connection 108 coupling the host device 102 to the electronic device 104. The connection 108 is depicted in FIG. 1 as including a conductor 110 (such as a power conductor), a ground conductor 112, and two signal conductors 114A and 114B. The connection 108 may be a Universal Serial Bus (USB) connection, or another type of connection. The connection 108 may be implemented as a cable in one embodiment.

The conductor 110 has a voltage thereon when the host device 102 is operating in a turned-on and fully operational state. That is, when the host device 102 is operating in a turned-on and fully operational state, the host device 102 provides a voltage on the conductor 110. The host device 102 may operate in a turned-on and fully operational state when it is not in a sleep state, a hibernation state, or a turned-off state. In the sleep, hibernation, and turned-off states, the host device 102 does not provide a voltage on the conductor 110.

For example, the host device 102 may be a desktop or laptop computer, or another type of computing or host device. In the turned-off state, the host device 102, where it is a computer, is turned off, such that when the device 102 is turned back on, it reboots to begin a new computing session. By comparison, in the hibernation state, the host device 102, where it is a computer, first saves its current state, such as system information, open applications, files, and so on, to a persistent storage like a hard disk drive before turning itself off. When the host device 102 is then turned back on, it reloads its previous state from the persistent storage, so that the previously saved computing session continues. Therefore, the hibernation state may be considered a special type of the turned-off state.

Furthermore, in the sleep state, the host device 102, where it is a computer, may enter a low-power mode, in which the device 102 retains power to its volatile memory to maintain its current state, but turns off many other peripherals, such as hard disk drives, monitors, and so on, to consume less power. In the turned-on and fully operational state, the host device 102, where it is a computer, is able to be actively used by the user. Both the sleep state and the turned-on and fully operational states are different types of turned-on states. The difference is that in the sleep state, power is provided usually just to the volatile memory of the host device 102, such as dynamic random-access memory (DRAM), and perhaps to some other components of the device 102. By comparison, in the turned-on and fully operational state, power is usually provided to all components and peripherals of the device 102.

The connection 108 includes at least the conductor 110. Generally, the connection 108 may also include the ground conductor 112 to provide a power loop between the host device 102 and the electronic device 104. The connection 108 is generally intended to allow the electronic device 104 and the host device 102 to communicate with one another over the connection 108. As a result, the connection 108 may also include one or more separate signal conductors 114, where in FIG. 1 two signal conductors 114A and 114B are depicted in accordance with the connection 108 being a USB-type connection. For example, where the electronic device 104 is an image-forming device, such as an inkjet-printing or a laser-printing device, the device 104 receives the image to be formed onto media thereby from the host device 102 over the connection 108, and more specifically over the signal conductors 114 thereof in one embodiment.

The electronic device 104 may be another type of peripheral device other than an image-forming device. The electronic device 104 receives power to perform its intended functionality, such as image formation on media, from the power source 106. In particular, the electronic device 104 has a power supply 116 that is coupled to the power source 106, where the power supply 116 converts or otherwise processes the power provided by the power source 106 so that the power is in a usable form for use by other components of the electronic device 104. The power source 106 may be an alternating current (AC) power source, such as a wall outlet, into which the power supply 116 is plugged. The power source 106 may also be a direct current (DC) power source, such as a battery. Whereas the power supply 116 is depicted in FIG. 1 as being internal to the electronic device 104, it may also be external to the device 104. Similarly, whereas the power source 106 is depicted in FIG. 1 as being external to the electronic device 104, it may also be internal to the device 104.

When a voltage is present on the conductor 110 of the connection 108, resulting from the host device 102 being in a state other than the hibernation, sleep, or turned-off state such that the device 102 provides the voltage on the conductor 110 (I suggested this change to eliminate "power" to so that there are consistent terms), the power supply 116 of the electronic device 104 is connected to the power source 106. As a result, the electronic device 104 is able to function and operate normally, because it receives power from the power source 106 via the power supply 116. That is, when the host device 102 is operating in a turned-on and fully operational state, it provides a voltage on the conductor 110, and this presence of the voltage on the conductor 110 causes the power supply 116 of the electronic device 104 to be connected to the power source 106.

However, when a voltage is absent on the conductor 110 of the connection 108, resulting from the host device 102 being in the hibernation, sleep, or turned-off state such that the device 102 does not provide the voltage on the conductor 110, the power supply 116 of the electronic device 104 is disconnected from the power source 106. As a result, the electronic device 104 enters a turned-off state as well, in which the device 104 consumes no power. That is, when the host device 102 is not operating in a turned-on and fully operational state, it does not provide a voltage on the conductor 110, and this absence of the voltage on the conductor 110 causes the power supply 116 of the electronic device 104 to be disconnected from the power source 106.

Power savings are afforded in the system 100 of FIG. 1 due to the electronic device 104 not consuming any power when the voltage is not present on the conductor 110 of the connection 108. The electronic device 104 does not have to even consume a small amount of power from the power source 106 so that it is able to turn itself back on at a later point in time, because the voltage on the conductor 110 of the connection 108 instead provides this minimal amount of power. Furthermore, as will become apparent in the next section of the detailed description, electronic device 104 may enter this turned-off state without the use, for instance, of complicated circuitry. This is because whether the electronic device 104 is in a turned-on and fully operational state or in a turned-off state is basically controlled by the presence or absence of the voltage on the conductor 110.

Power-Switching Mechanism

Figure 2:
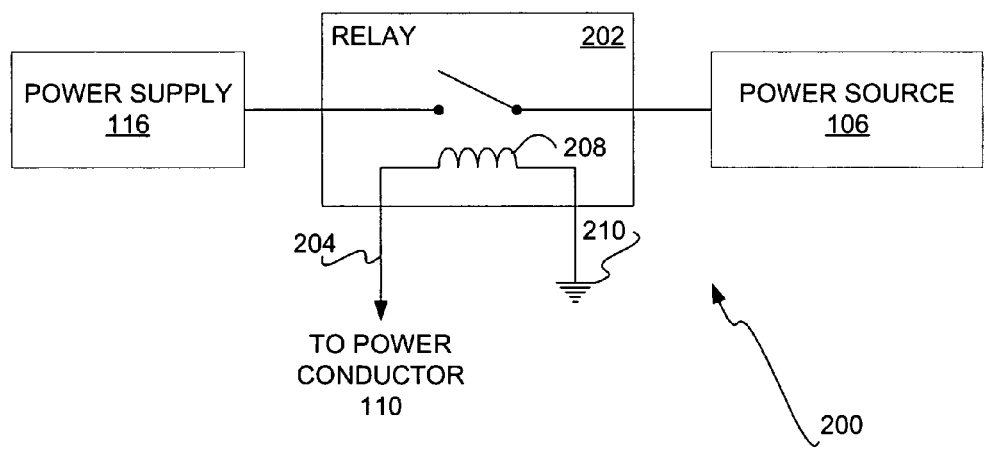
FIG. 2 is a diagram of an embodiment of a power-switching mechanism for an electronic device, according to an embodiment of the invention.

FIG. 2 shows a power-switching mechanism 200 for the electronic device 104, according to an embodiment of the invention. The power-switching mechanism 200 includes a relay 202 and a control input line 204. The relay 202 is more generally a switching device, such as a switch, a semiconductor switching device, and so on. That is, whereas the relay 202 is described and depicted in FIG. 2 as particular to one embodiment of the invention, in other embodiments of the invention, other types of switching devices may be employed. Furthermore, the term relay is used herein inclusively as a switching device, to encompass other types of switching devices in addition to the electrical component commonly referred to as a relay. The relay 202 is connected between the power supply 116 of the electronic device 104, and the power source 106. The relay 202 itself includes a switch 206 and an actuation element 208, as can be appreciated by those of ordinary skill within the art. The actuation element 208 may be a coil that when energized due to current running therethrough causes the switch 206 to close. The relay 202 is thus a normally open relay, including a normally open switch 206, in one embodiment of the invention.

The switch 206 has one terminal connected to the power supply 116, and another terminal connected to the power source 106. The control input line 204 is connected to the conductor 110 of the connection 108 between the host device 102 and the electronic device 104. When the conductor 110 has a voltage thereon, provided by the host device 102, the actuation element 208 is energized, as one terminal of the actuation element 208 is connected to the control input line 204, and the other terminal of the element 208 is connected to ground 210. Energizing the actuation element 208 causes the switch 206 to close, connecting the power supply 116 to the power source 106. When the conductor 110 does not have a voltage thereon, the actuation element 208 is de-energized, causing the switch 206 to open, and disconnecting the power supply 116 from the power source 106. In one embodiment, a bias network may be included between the control input line 204 and the relay 202, to limit current from the conductor 110 to the relay 202. Such a bias network may include a resistor, for example.

The power-switching mechanism 200 serves to connect the power source 106 to the power supply 116 of the electronic device 104 when the host device 102 is in a state such that it provides a voltage on the conductor 110, to which the control input line 204 is connected. When the host device 102 is in a state such that it does not provide a voltage on the conductor 110, the mechanism 200 disconnects the power source 106 from the power supply 116 of the electronic device 104. As a result, the electronic device 104 consumes no power when a voltage is absent on the conductor 110. The relay 202 is powered by the voltage on the conductor 110, such that the power supply 116 can be completely turned off and disconnected from the power source 106, because the host device 102 will provide the voltage on the conductor 110 for the supply 116 to again be connected to the source 106.

Figure 3:
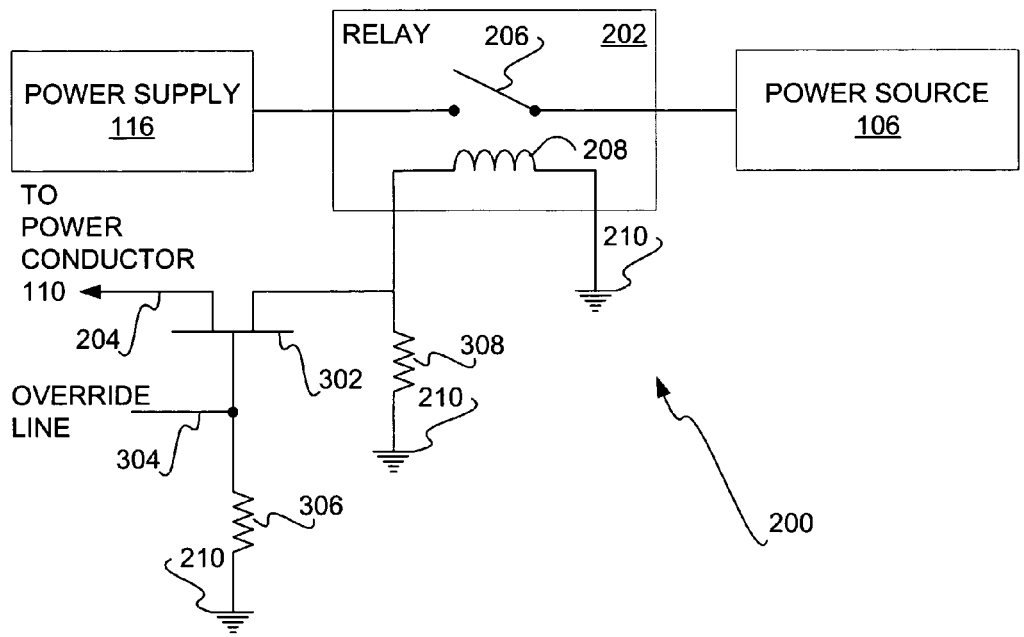
FIG. 3 is a diagram of the embodiment of the power-switching mechanism for an electronic device that is more detailed than but consistent with the mechanism of FIG. 2, according to another embodiment of the invention.

FIG. 3 shows the power-switching mechanism 200 in more detail than but consistent with the mechanism 200 of FIG. 2, according to another embodiment of the invention. In FIG. 3, a switch 302 and an override line 304 have been added to the power-switching mechanism 200. In addition, resistors 306 and 308 are depicted in FIG. 2 for the specific implementation or embodiment where a bipolar junction transistor (BJT) is used as the switch 302, as shown in FIG. 2, and as can be appreciated by those of ordinary skill within the art. Each of the resistors 306 and 308 terminate to ground 210 as shown in FIG. 2. Furthermore, whereas in FIG. 2 the control input line 204 is connected directly to a terminal of the actuation element 208 of the relay 202, in FIG. 3 the switch 302 is connected between the line 204 and the actuation element 208. In one embodiment, a resistor may also be placed in series between the switch 302 and the connection point of the relay 202 and the resistor 308.

When the override line 304 is high, the switch 302 is on, and the control input line 204, being connected to the conductor 110, controls energizing of the actuation element 208 of the relay 202, and thus is able to control the relay 202 and whether the power supply 116 is connected to the power source 106. Therefore, when the override line 304 is high, the power-switching mechanism 200 of FIG. 3 operates in the same way as the power-switching mechanism 200 of FIG. 2. However, when the override line 304 is low, the switch 302 is off. In this situation, the control input line 204 does not control energizing of the actuation element 208 of the relay 202, and the relay 202 remains off regardless of the voltage on the conductor 110 to which the control input line 204 is connected. Therefore, when the switch 302 is off, due to the override line 304 being low, the electronic device 104 remains in the turned-off state, and consumes no power, regardless of whether a voltage is present on the conductor 110.

In one embodiment, the switch 302 may be turned on and off by user control. For example, the override line 304 may go high or low based on the state of actuation of an externally accessible physical switch on the electronic device 104. The default state of the override line 304 may be high, allowing the conductor 110 via the control input line 204 to control the relay 202, and whether or not the power supply 116 is connected to the power source 106. However, the user may be able to actuate the externally accessible physical switch on the electronic device 104 to cause the override line 304 to go low, causing the power supply 116 to become disconnected from the power source 106 regardless of the voltage present on the conductor 110. This may be desirable to allow the user to turn off the electronic device 104 even when the host device 102 is in a state in which it is providing a voltage on the conductor 110.

In such an embodiment, then, the user is able to override control of the relay 202 by the control input line 204 via the voltage present on the conductor 110, to disconnect the power supply 116 from the power source 106. The switch 302 in this embodiment is thus effectively turned on and off by user control, such that the user is able to control whether the electronic device 104 is on when the host device 102 is on. However, the user remains unable to control whether the electronic device 104 is on when the host device 102 is off, such that the device 104 remains off when the device 102 is off regardless of whether the switch 302 has been turned on or off.

Such inability to turn on the electronic device 104 when the host device 102 is off is due to no voltage being present on the conductor 110 when the device 102 is off. Therefore, even if the switch 302 is on, there is no voltage on the conductor 110 and thus on the control input line 204 to energize the actuation element 208 of the relay 202. The user is thus able to manually override connection of the power supply 116 to the power source 106 by the voltage on the conductor 110, but is unable to manually override disconnection of the supply 116 from the source 106.

Electronic Device

Figure 4:
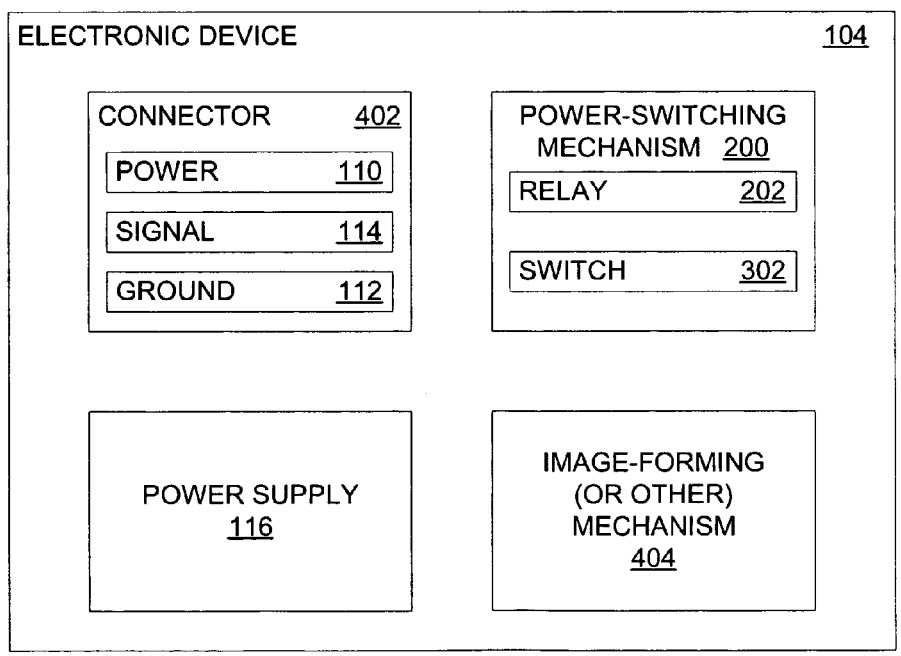
FIG. 4 is a block diagram of an embodiment of an electronic device including an embodiment of a power-switching mechanism, according to an embodiment of the invention.

FIG. 4 shows a block diagram of the electronic device 104, according to an embodiment of the invention. The electronic device includes a connector 402, the power-switching mechanism 200, a power supply 116, and an image-forming (or other) mechanism 404. Where the mechanism 404 is an image-forming mechanism, the electronic device 104 is an image-forming device. For instance, the image-forming mechanism 404 may be an inkjet-printing mechanism or a laser-printing mechanism, such that the electronic device 104 is an inkjet-printing device, such as an inkjet printer, or a laser-printing device, such as a laser printer. The mechanism 404 generally includes those components to perform the intended functionality of the electronic device 104. Thus, the image-forming mechanism 404 includes image-forming components to perform the image-forming functionality of the electronic device 104. Where the intended functionality of the electronic device 104 is other than image formation, the mechanism 404 includes those components to perform such other functionality.

The connector 402 includes the conductor 110, and may also include the ground conductor 112 and the signal conductors 114. The connector 402 is receptive to the connection 108 coupling the host device 102 to the electronic device 104. For instance, where the connection 108 is a Universal Serial Bus (USB) cable terminating in a USB plug, the connector 402 may be a USB receptacle into which the USB cable can be inserted. More generally, the connector 402 is capable of connecting the electronic device 104 to the host device 102, such that the device 104 communicates with the device 102 through the connector 402. As before, the conductor 110 has a voltage present when the host device 102 is in a state other than a sleep state, a hibernation state, or a turned-off state.

The power-switching mechanism 200 includes the relay 202, and may also include the switch 302. The power supply 116 provides power to the image-forming (or other) mechanism 404, from the power source 106, and is connected to the power source 106 through the relay 202 of the power-switching mechanism 200, as has been described, where the relay 202 is controlled by the voltage on the conductor 110, and optionally via the switch 302. Thus, the relay 202 connects the power supply 116 to the power source 106 when the voltage is present on the conductor 110, and where the switch 302 is either not present or is present and on.

Method

Figure 5:
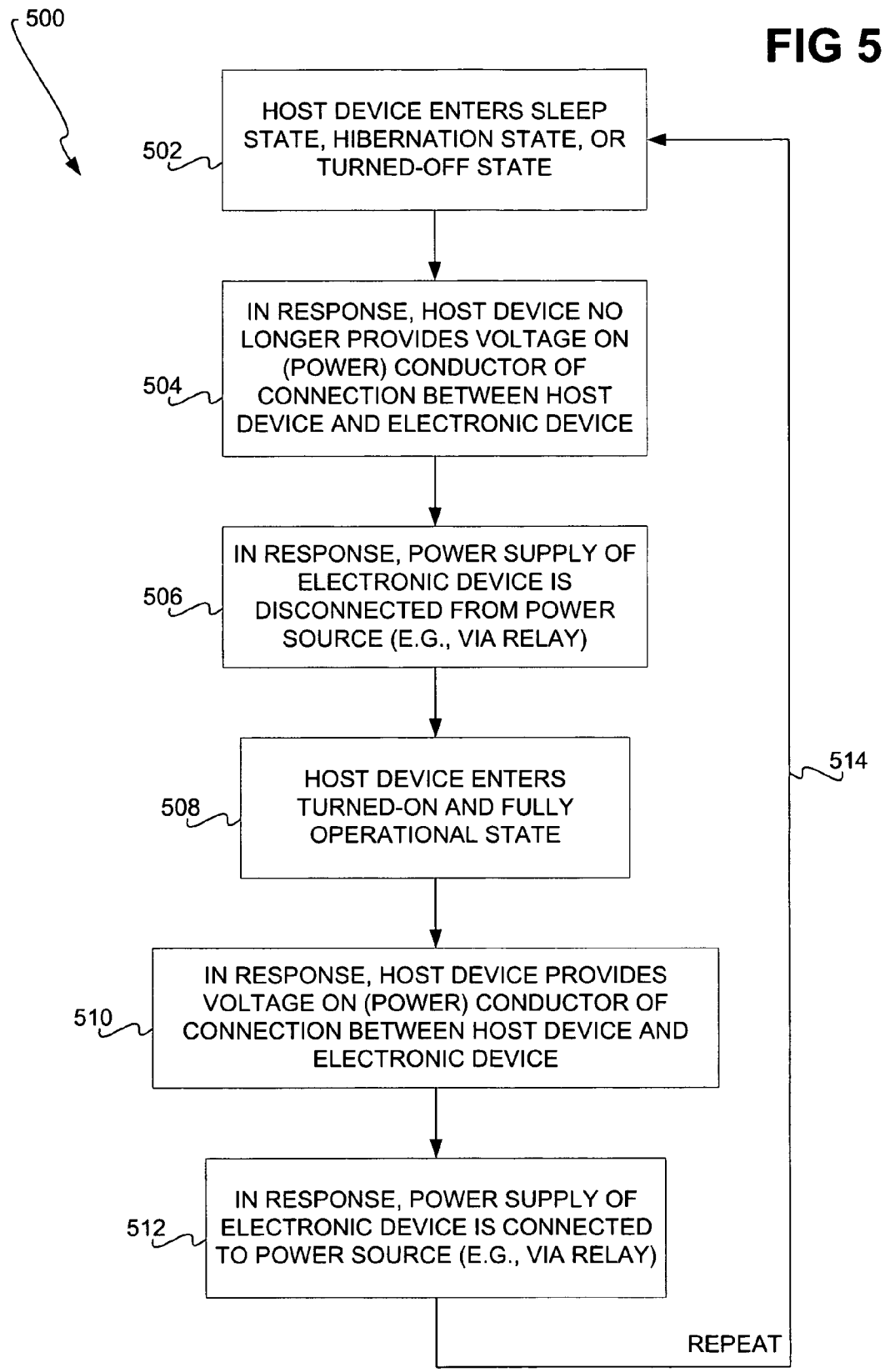
FIG. 5 is a flowchart of an embodiment of a method for using a power-switching mechanism for an electronic device, according to an embodiment of the invention.

FIG. 5 shows a method 500 for using the power-switching mechanism 200, as part of the electronic device 104, and in conjunction with the host device 102, according to an embodiment of the invention. The power-switching mechanism 200 as described in relation to FIG. 5 is that of FIG. 2, and not that of FIG. 3. That is, the method 500 is described in relation to the power-switching mechanism 200 not including the switch 302 and the override line 304, for descriptive clarity, as can be appreciated by those of ordinary skill within the art.

The host device 102 enters, or begins at, a sleep state, a hibernation state, or a turned-off state (502). In response to the host device 102 entering one of these states, the device 102 no longer provides a voltage on the conductor 110, such as a power conductor in one embodiment of the invention, of the connection 108 between the device 102 and the electronic device 104 (504). In response to the absence of a voltage on the conductor 110, the power supply 116 of the electronic device 104 is disconnected from the power source 106 (506). For instance, the voltage on the conductor 110 may control the relay 202 of the power-switching mechanism 200 coupling the power supply 116 to the power source 106, such that the absence of the voltage turns off the relay 202, disconnecting the supply 116 from the source 106.

At a later point in time, the host device 102 enters a turned-on and fully operational state (508). In response to the host device 102 entering this state, the device 102 provides a voltage on the conductor 110, such as a power conductor in one embodiment of the invention (510). In response to the presence of a voltage on the conductor 110, the power supply 116 of the electronic device 104 is connected to the power source 106 (512). For instance, the voltage on the conductor 110 may control the relay 202 coupling the power supply 116 to the power source 106, such that the presence of the voltage turns on the relay 202, connecting the supply 116 to the source 106. At a later point in time, the method 500 may repeat at 502, as indicated by the line 514. Furthermore, the method 500 may begin at 508, instead of at 502.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

I claim:

1. A power-switching mechanism for an electronic device comprising:
    a control input connectable to a conductor of a connection between the electronic device and a host device; and,
    a switching device capable of coupling a power source to a power supply, the switching device controlled by the control input such that the switching device connects the power source to the power supply when a voltage is present on the conductor and the switching device disconnects the power supply from the power source when the voltage is absent on the conductor.

2. The power-switching mechanism of claim 1, wherein the electronic device consumes no power when the voltage is absent on the conductor and the switching device correspondingly disconnects the power supply of the electronic device from the power source.

3. The power-switching mechanism of claim 1, wherein the conductor has the voltage present when the host device is in a turned-on and fully operational state.

4. The power-switching mechanism of claim 1, further comprising a switch coupled between the control input and the switching device, such that when the switch is on, the control input is able to control the switching device via the voltage present on the conductor, and when the switch is off, the switching device disconnects the power supply from the power source and the control input is unable to control the switching device, regardless of the voltage present on the conductor.

5. The power-switching mechanism of claim 4, wherein the switch is turned on and off by user control, such that the user is able to override control of the switching device by the control input via the voltage present on the conductor for disconnecting the power supply from the power source.

6. The power-switching mechanism of claim 4, wherein the switch is turned on and off by user control, such that the user is able to control whether the electronic device is on when the host device is on but is unable to control whether the electronic device is on when the host device is off, the electronic device remaining off when the host device is off regardless of user control of the switch.

7. The power-switching mechanism of claim 1, wherein the connection between the electronic device and the host device is a cable including the conductor, a ground conductor, and at least one signal conductor over which the electronic device and the host device communicate.

8. The power-switching mechanism of claim 1, wherein the electronic device is an image-forming device, such that the image-forming device is to receive an image to be formed on media from the host device over the connection.

9. The power-switching mechanism of claim 1, wherein the switching device is a relay.

10. The power-switching mechanism of claim 1, wherein the conductor is a power conductor.

11. A power-switching mechanism for an electronic device comprising:
    a control input line connectable to a power conductor of a connection between the electronic device and a host device over which the electronic device and the host device communicate, the power conductor having a voltage present when the host device is in a state other than one of: a sleep state, a hibernation state, and a turned-off state; and,
    a relay capable of coupling a power source to a power supply of the electronic device, the relay controlled by the control input line such that the relay connects the power source to the power supply when the voltage is present on the power conductor and the relay disconnects the power supply from the power source when the voltage is absent on the power conductor.

12. The power-switching mechanism of claim 11, wherein the electronic device consumes no power when the voltage is absent on the power conductor and the relay correspondingly disconnects the power supply of the electronic device from the power source.

13. The power-switching mechanism of claim 11, wherein the power conductor has the voltage present when the host device is in a turned-on and fully operational state.

14. The power-switching mechanism of claim 11, further comprising a switch coupled between the control input line and the relay, such that when the switch is on, the control input line is able to control the relay via the voltage present on the power conductor, and when the switch is off, the relay disconnects the power supply from the power source and the control input line is unable to control the relay, regardless of the voltage present on the power conductor.

15. The power-switching mechanism of claim 14, wherein the switch is turned on and off by user control, such that the user is able to override control of the relay by the control input line via the voltage present on the power conductor for disconnecting the power supply from the power source.

16. The power-switching mechanism of claim 14, wherein the switch is turned on and off by user control, such that the user is able to control whether the electronic device is on when the host device is on but is unable to control whether the electronic device is on when the host device is off, the electronic device remaining off when the host device is off regardless of user control of the switch.

17. The power-switching mechanism of claim 11, wherein the connection between the electronic device and the host device is a cable including the power conductor, a ground conductor, and at least one signal conductor over which the electronic device and the host device communicate.

18. The power-switching mechanism of claim 11, wherein the electronic device is an image-forming device, such that the image-forming device is to receive an image to be formed on media from the host device over the connection.

19. A power-switching mechanism for an electronic device comprising:
    a switching device capable of coupling a power source to a power supply of the electronic device; and, means for controlling the switching device based in correspondence with a voltage present on a power conductor of a connection between the electronic device and a host device over which the electronic device and the host device communicate, the power conductor having the voltage present when the host device is in a state other than one of: a sleep state, a hibernation state, and a turned-off state.

20. The power-switching mechanism of claim 19, wherein the switching device is a relay.

21. The power-switching mechanism of claim 19, wherein the electronic device consumes no power when the voltage is absent on the power conductor and the relay correspondingly disconnects the power supply of the electronic device from the power source.

22. The power-switching mechanism of claim 19, wherein the power conductor has the voltage present when the host device is in a turned-on and fully operational state.

23. The power-switching mechanism of claim 19, further comprising means for manually overriding coupling of the power source to the power supply when the voltage is present on the power conductor.

24. The power-switching mechanism of claim 23, wherein, via the means for manually overriding coupling of the power source to the power supply, a user is able to control whether the electronic device is on when the host device is on but is unable to control whether the electronic device is on when the host device is off, the electronic device remaining off when the host device is off.

25. The power-switching mechanism of claim 19, wherein the connection between the electronic device and the host device is a cable including the power conductor, a ground conductor, and at least one signal conductor over which the electronic device and the host device communicate.

26. The power-switching mechanism of claim 19, wherein the electronic device is an image-forming device, such that the image-forming device is to receive an image to be formed on media from the host device over the connection.

27. An electronic device:
a power supply to receive power from a power source for operating the electronic device;
a connector capable of connecting the electronic device to a host device and over which the electronic device and the host device communicate;
a power conductor within the connector having a voltage present when the host device is in a state other than one of: a sleep state, a hibernation state, and a turned-off state; and,
a relay to control connection of the power supply to the power source, the relay controlled by the power conductor, such that the relay connects the power source to the power supply when the voltage is present on the power conductor and the relay disconnects the power supply from the power source when the voltage is absent on the power conductor.

28. The electronic device of claim 27, wherein the electronic device consumes no power when the voltage is absent on the power conductor.

29. The electronic device of claim 27, wherein the power conductor has the voltage present when the host device is in a turned-on and fully operational state.

30. The electronic device of claim 27, further comprising a switch coupled between power conductor and the relay, such that when the switch is on, the voltage present on the power conductor is able to control the relay, and when the switch is off, the relay disconnects the power supply from the power source and the power conductor no longer controls the relay, regardless of the voltage present thereon.

31. The electronic device of claim 30, wherein the switch is turned on and off by user control, such that the user is able to control whether the electronic device is on when the host device is on but is unable to control whether the electronic device is on when the host device is off.

32. The electronic device of claim 27, further comprising a ground conductor and at least one signal conductor within the connector.

33. The electronic device of claim 27, further comprising an image-forming mechanism to receive power from the power supply and to form images on media, such that the electronic device is an image-forming device that is to receive an image to be formed on the media from the host device through the connector.

34. An electronic device comprising:
a power supply to receive power from a power source for operating the electronic device;
a connector capable of connecting the electronic device to a host device and over which the electronic device and the host device communicate;
a power conductor within the connector having a voltage present when the host device is in a state other than one of: a sleep state, a hibernation state, and a turned-off state; and,
means for controlling connection of the power supply to the power source based on whether a voltage is present on the power conductor.

35. The electronic device of claim 34, wherein the electronic device consumes no power when the voltage is absent on the power conductor.

36. The electronic device of claim 34, wherein the power conductor has the voltage present when the host device is in a turned-on and fully operational state.

37. The electronic device of claim 34, further comprising means for manually overriding coupling of the power source to the power supply when the voltage is present on the power conductor.

38. The electronic device of claim 37, wherein, via the means for manually overriding coupling of the power source to the power supply, a user is able to control when the electronic device is on when the host device is on but is unable to control whether the electronic device is on when the host device is off.

39. The electronic device of claim 34, further comprising a ground conductor and at least one signal conductor within the connector.

40. The electronic device of claim 34, further comprising an image-forming mechanism to receive power from the power supply and to form images on media, such that the electronic device is an image-forming device that is to receive an image to be formed on the media from the host device through the connector.

41. A system comprising:
a connection between a host device and a peripheral device over which the host device and the peripheral device communicate, and having at least a conductor;
the host device to provide a voltage on the conductor when the host device is in a state other than one of: a sleep state, a hibernation state, and a turned-off state; and,
the peripheral device having a power supply connectable to a power source, the power supply connected to the power source when the voltage is present on the conductor.

42. The system of claim 41, wherein the electronic device consumes no power when the voltage is absent on the conductor.

43. The system of claim 41, wherein the host device provides the voltage on the conductor when the host device is in a turned-on and fully operational state.

44. The system of claim 41, wherein the connection further includes a ground conductor, and at least one signal conductor over which the electronic device and the host device communicate.

45. The system of claim 41, wherein the electronic device is an image-forming device, such that the image-forming device is to receive an image to be formed on media from the host device over the connection.

46. A method comprising:
   in response to a host device entering one of a sleep state, a hibernation state, and a turned-off state,
   the host device no longer providing a voltage on a power conductor of a connection between the host device and an electronic device over which the host device and the electronic device communicate;
   in response to the host device no longer providing the voltage on the power conductor, disconnecting a power supply of the electronic device from a power source, such that the electronic device consumes no power.

47. The method of claim 46, further comprising the host device initially entering one of the sleep state, the hibernation state, and the turned off state.

48. The method of claim 46, wherein disconnecting the power supply of the electronic device from the power source comprises the voltage on the power conductor controlling a relay coupling the power supply to the power source, such that the voltage being absent on the power conductor turns off the relay.

49. The method of claim 46, further comprising, in response to the host device entering a turned-on and fully operational state:
   the host device providing the voltage on the power conductor of the connection;
   in response to the host device providing the voltage on the power conductor, connecting the power supply of the electronic device to the power source, such that the electronic device is on and operational.

50. The method of claim 49, further comprising the host device initially entering the turned-on and fully operational state.

51. The method of claim 49, wherein connecting the power supply of the electronic device to the power source comprises the voltage on the power conductor controlling a relay coupling the power supply to the power source, such that the voltage being present on the power conductor turns on the relay.

* * * * *